(12) United States Patent
Kondo et al.

(10) Patent No.: US 6,730,184 B2
(45) Date of Patent: May 4, 2004

(54) METHOD FOR PRODUCING FIBER-REINFORCED COMPOSITE SEMI-HARDENED PRODUCT HAVING JOGGLE, AND METHOD FOR PRODUCING PREFORMED STRUCTURE USING SAME

(75) Inventors: Junichi Kondo, Saitama-ken (JP); Nobuo Matsui, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 300 days.

(21) Appl. No.: 09/843,764

(22) Filed: Apr. 30, 2001

(65) Prior Publication Data

US 2001/0035249 A1 Nov. 1, 2001

(30) Foreign Application Priority Data

May 1, 2000 (JP) ........................................ 2000-132681

(51) Int. Cl.$^7$ ............................................... B32B 31/00
(52) U.S. Cl. ........................ 156/221; 156/182; 156/245
(58) Field of Search .................. 156/245, 65, 182, 156/196, 221, 222, 223, 242, 307.1; 264/250, 257, 258; 244/119, 123, 125, 129.1

(56) References Cited

U.S. PATENT DOCUMENTS

| | | |
|---|---|---|
| 4,151,031 A | 4/1979 | Goad et al. |
| 5,242,523 A | 9/1993 | Willden et al. |
| 6,355,133 B1 * | 3/2002 | Williams ............... 156/296 |
| 2001/0030380 A1 * | 10/2001 | Fujihira ............... 264/212 |

OTHER PUBLICATIONS

Patent Abstracts of Japan, JP 05 008316, Jan. 19, 1993.

European Search Report for EP 01 30 3989.

* cited by examiner

Primary Examiner—Jeff H. Aftergut
Assistant Examiner—Gladys Corcoran
(74) Attorney, Agent, or Firm—Sughrue Mion, PLLC (57) ABSTRACT

A method for producing a stepped semi-hardened product having a joggle in an edge portion, comprising: the first process where a plurality of first sheets made of a fiber-reinforced composite are laminated to each other, heated under a pressure and cooled under a pressure to provide a first flat plate-shaped laminate; the second process where the first flat plate-shaped laminate is softened by heating, placed on a first forming tool and formed by cooling under a pressure to prepare a simple shaped intermediate; and the third process where an edge portion of the simple shaped intermediate is heated under a pressure to form said joggle. A method for producing a preformed structure composed of the stepped semi-hardened product and a simple shaped semi-hardened product is also provided.

9 Claims, 6 Drawing Sheets

Fig. 10 ously produced with reduced processes and production costs by a method where a flat plate-shaped laminate is provided by laminating a plurality of sheets made of a fiber-reinforced composite beforehand, a simple shaped intermediate is prepared by forming the flat plate-shaped laminate, and an edge portion of the simple shaped intermediate is heated under a pressure. The present invention has been accomplished by the finding.

METHOD FOR PRODUCING FIBER-REINFORCED COMPOSITE SEMI-HARDENED PRODUCT HAVING JOGGLE, AND METHOD FOR PRODUCING PREFORMED STRUCTURE USING SAME

BACKGROUND OF THE INVENTION

The present invention relates to a method for producing a stepped semi-hardened product having a joggle made of a fiber-reinforced composite, and a method for producing a preformed structure composed of the stepped semi-hardened product having a joggle and a simple shaped semi-hardened product.

Stiffened panels made of a fiber-reinforced composite (prepreg) are light in weight and high in strength, to have been widely used for automobiles, ships, aircrafts, etc. The stiffened panels are generally produced by placing members for a skin and stiffeners (stringers and frames) each made of a fiber-reinforced composite on a forming tool to prepare an assembly, and by adhesive-forming the assembly by heating under a pressure using a pressure bag, etc. It is preferred that members composing the stiffeners are arranged on a skin member as a semi-hardened preformed structure, and completely hardened with the skin member, from the viewpoint of weight-reduction.

Figure 1:
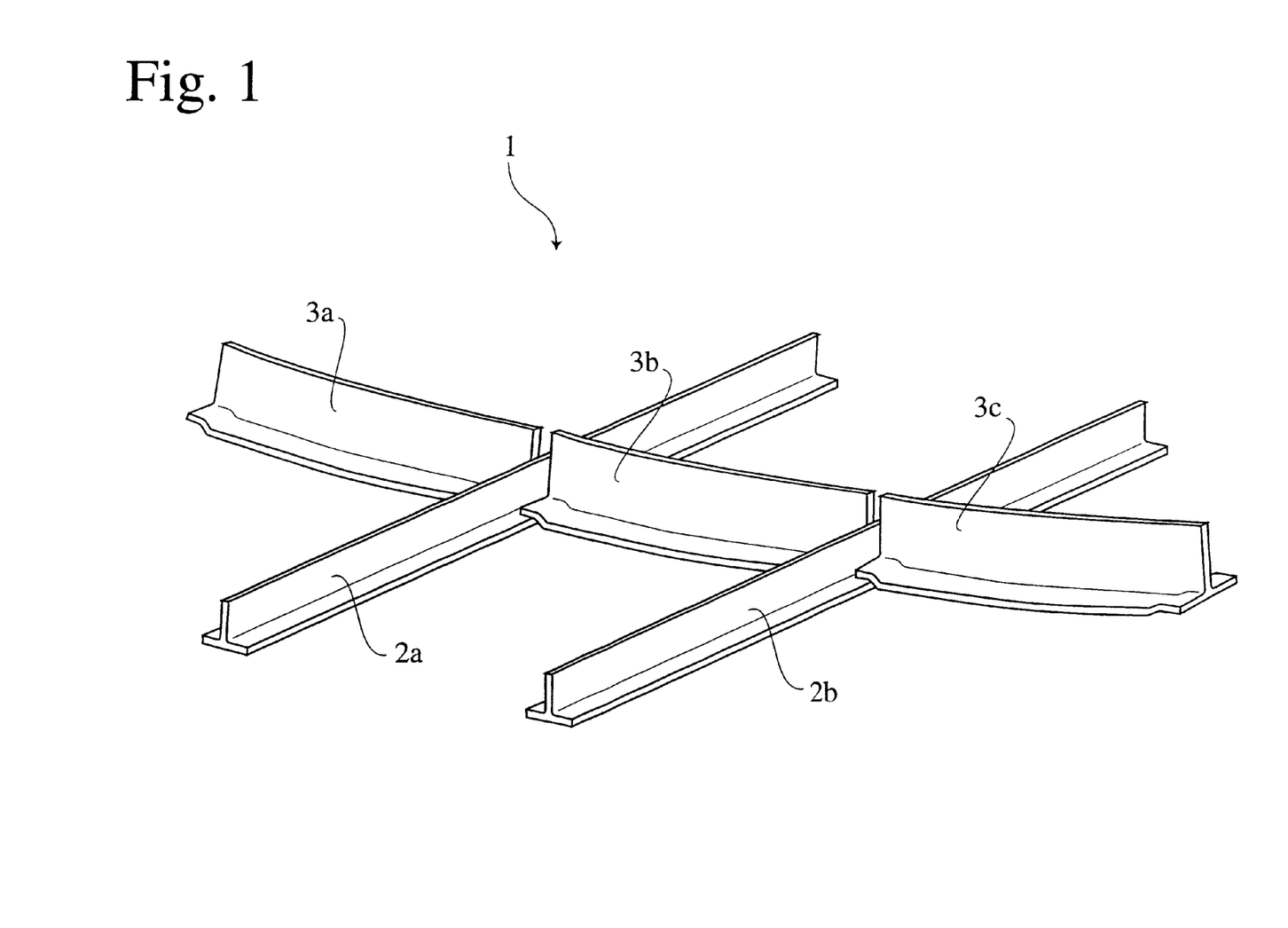
FIG. 1 is a perspective view showing an example of a preformed structure.

FIG. 1 is a perspective view showing an example of the preformed structure. In a preformed structure 1 of FIG. 1, simple shaped semi-hardened products 2a and 2b are arranged at a predetermined interval as the stringer members, and joggles of stepped semi-hardened products 3a, 3b and 3c are piled on the simple shaped semi-hardened products 2a and 2b. Each semi-hardened products 2a, 2b, 3a, 3b and 3c has a T-shaped section of a base portion and a projecting portion, although they may have a section of C-shape, I-shape, etc.

Conventionally, the above-mentioned semi-hardened products have been produced by a method comprising the steps of: cutting fiber-reinforced composites many times to obtain desired lamination structures, respectively; laminating and forming the fiber-reinforced composites on a forming tool. However, this method necessitates complicated works, in particular, lamination of the fiber-reinforced composites on the forming tool is achieved by handwork to require much effort. Further, in the case of such a complicated shaped semi-hardened product that has a joggle, the above lamination is remarkably difficult, thereby failing to produce them with a uniform quality. Furthermore, in the case of producing a plurality of semi-hardened products, which have different shapes, lengths, etc., the above conventional method demands many forming tools for each products to increase production costs.

OBJECT AND SUMMARY OF THE INVENTION

Accordingly, an object of the present invention is to provide a method for producing a stepped semi-hardened product having a joggle made of a fiber-reinforced composite, where the stepped semi-hardened product of uniform, high quality can be stably produced with reduced processes and production costs.

Another object of the present invention is to provide a method for producing a preformed structure utilizing the above method for producing a stepped semi-hardened product, which can produce the preformed structure with reduced processes and production costs.

As a result of intensive research in view of the above objects, the inventor has found that a stepped semi-hardened Thus, a method for producing a stepped semi-hardened product having a joggle in an edge portion according to the present invention comprises: the first process where a plurality of first sheets made of a fiber-reinforced composite are laminated to each other, heated under a pressure and cooled under a pressure to provide a first flat plate-shaped laminate; the second process where the first flat plate-shaped laminate is softened by heating, placed on a first forming tool and formed by cooling under a pressure to prepare a simple shaped intermediate; and the third process where an edge portion of the simple shaped intermediate is heated under a pressure to form the joggle.

The method for producing a stepped semi-hardened product of the present invention is suitable for producing such that having a T-shaped section.

In a method for producing a preformed structure of the present invention, the preformed structure is composed of a stepped semi-hardened product having a joggle and a simple shaped semi-hardened product each made of a fiber-reinforced composite,     the stepped semi-hardened product is produced by: the first process where a plurality of first sheets made of a fiber-reinforced composite are laminated to each other, heated under a pressure and cooled under a pressure to provide a first flat plate-shaped laminate; the second process where the first flat plate-shaped laminate is softened by heating, placed on a first forming tool and formed by cooling under a pressure to prepare a simple shaped intermediate; and the third process where an edge portion of the simple shaped intermediate is heated under a pressure to form the joggle,     the simple shaped semi-hardened product is produced by: the fourth process where a plurality of second sheets made of a fiber-reinforced composite are laminated to each other, heated under a pressure and cooled under a pressure to provide a second flat plate-shaped laminate; and the fifth process where the second flat plate-shaped laminate is softened by heating, placed on a second forming tool and formed by cooling under a pressure, and     the joggle of the stepped semi-hardened product is piled on the simple shaped semi-hardened product.

The method for producing a preformed structure of the present invention is suitable for producing such that composed of the stepped semi-hardened product and the simple shaped semi-hardened product each having a T-shaped section.

DETAILED DESCRIPTION OF THE PREFERRED EMBODIMENTS

[1] Method for Producing Stepped Semi-Hardened Product Having Joggle

A method for producing a stepped semi-hardened product having a joggle in an edge portion according to the present invention comprises: the first process where a plurality of first sheets made of a fiber-reinforced composite are laminated to each other, heated under a pressure and cooled under a pressure to provide a first flat plate-shaped laminate; the second process where the first flat plate-shaped laminate is softened by heating, placed on a first forming tool and formed by cooling under a pressure to prepare a simple shaped intermediate; and the third process where an edge portion of the simple shaped intermediate is heated under a pressure to form the joggle.

In the present invention, "semi-hardened state" means such that the hardening degree of the fiber-reinforced composite is 1 to 80%. In the case where a semi-hardened stringer member or a semi-hardened frame member is produced by the method of the present invention, the semi-hardened member preferably has a hardening degree of 1 to 50% to obtain such a member that can be easily handled and stored, and that has properties suitable for integration with a skin member. The method of the present invention is suitably utilized for producing such a member.

In the present invention, the fiber-reinforced composite is composed of such a reinforcing fiber as a carbon fiber, a glass fiber, an aramid fiber, etc. impregnated with a thermosetting resin or a thermoplastic resin. The thermosetting resin may be an epoxy resin, a bismaleimide resin, a phenol resin, etc., and the thermoplastic resin may be PEEK, nylon 6, nylon 66, polyethylene terephthalate, etc. Preferred as the thermosetting resin is an epoxy resin, and preferred as the thermoplastic resin is nylon. Ratio of the thermosetting resin or the thermoplastic resin to the reinforcing fiber in the fiber-reinforced composite may be appropriately controlled. Further, size of the fiber-reinforced composite is not particularly limited. The lamination structure of the first flat plate-shaped laminate, including the direction of the reinforcing fiber composing each fiber-reinforced composite therein, is also not particularly limited. For example, each fiber-reinforced composite may be laminated in such a direction as (±45°/0°/0°/0°/0°to 90°). Additionally, the number of the laminated fiber-reinforced composites may be appropriately selected.

In the first process, the first sheets are preferably heated at 20 to 100° C. under a pressure by a hot press roll, a hot pressing machine, etc. When the heating temperature is more than 100° C., fluidity of the resin in the fiber-reinforced composite is excessively increased. On the other hand, the heating temperature of less than 20° C. invites insufficient stacking of the first flat plate-shaped laminate. Further, the pressure is preferably 0.1 to 10 kg/cm$^2$. The pressure of more than 10 kg/cm$^2$ results in disordered fiber orientation of the fiber-reinforced composite, and the pressure of less than 0.1 kg/cm$^2$ invites insufficient stacking of the first flat plate-shaped laminate.

In the first process, the first sheets are preferably cooled at 10 to 30° C. under a pressure by a cold press roll, a cold pressing machine, etc. When the cooling temperature is more than 30° C., the first sheet tends to be peeled off the first flat plate-shaped laminate. On the other hand, the cooling temperature of less than 10° C. requires much energy for cooling. Further, the pressure is preferably 0.1 to 10 kg/cm$^2$. The pressure of more than 10 kg/cm$^2$ results in disordered fiber orientation of the fiber-reinforced composite, and the pressure of less than 0.1 kg/cm$^2$ invites insufficient stacking of the first flat plate-shaped laminate.

The first flat plate-shaped laminate provided by the first process may be cut into a plate having a desired shape by a cutting machine having a cutting blade, a water jet, etc. The size of the plate may be properly controlled depending on its use.

In the second process, the first flat plate-shaped laminate may be heated and softened by an oven, a heater, etc. The heating is preferably carried out at 60 to 100° C. for 10 to 90 minutes.

In the second process, the first flat plate-shaped laminate is preferably cooled at 0 to 50° C. under a pressure by a cold press roll, a cold pressing machine, etc. When the cooling temperature is more than 50° C., the formed simple shaped intermediate is returned into a plate shape by insufficient cooling. On the other hand, when the cooling temperature is less than 0° C., fluidity of the resin in the fiber-reinforced composite is reduced too much before forming, resulting in insufficient forming. Further, the pressure is preferably 0.1 to 10 kg/cm$^2$. The pressure of more than 10 kg/cm$^2$ results in disordered fiber orientation of the fiber-reinforced composite, and the pressure of less than 0.1 kg/cm$^2$ invites insufficient forming.

In the second process, the first forming tool may be made of a steel, aluminum, etc. The first forming tool may have a shape not corresponding to the joggle in the stepped semi-hardened product, therefore, the first forming tool can be commonly used for producing a semi-hardened product having no joggle, stepped semi-hardened products having different length, etc. to reduce the production costs.

In the third process, although a method of heating and pressurizing the simple shaped intermediate is not particularly limited, it is preferable that the simple shaped intermediate is heated by a dryer at the edge portion, then placed in a pressing machine, and lightly pressed by man-power.

Height of the joggle is also not particularly limited. For example, if the stepped semi-hardened product is used as a flame member composing a body structure of an aircraft, the joggle preferably has a height of 0.5 to 5 mm.

The method for producing a stepped semi-hardened product of the present invention is suitable for producing such that has a T-shaped section. The method is also usable for production of stepped semi-hardened product having a various section such as C-shape, I-shape, etc. The stepped semi-hardened product may be a straight line or a curved line in shape in the lengthening direction.

Figure 2:
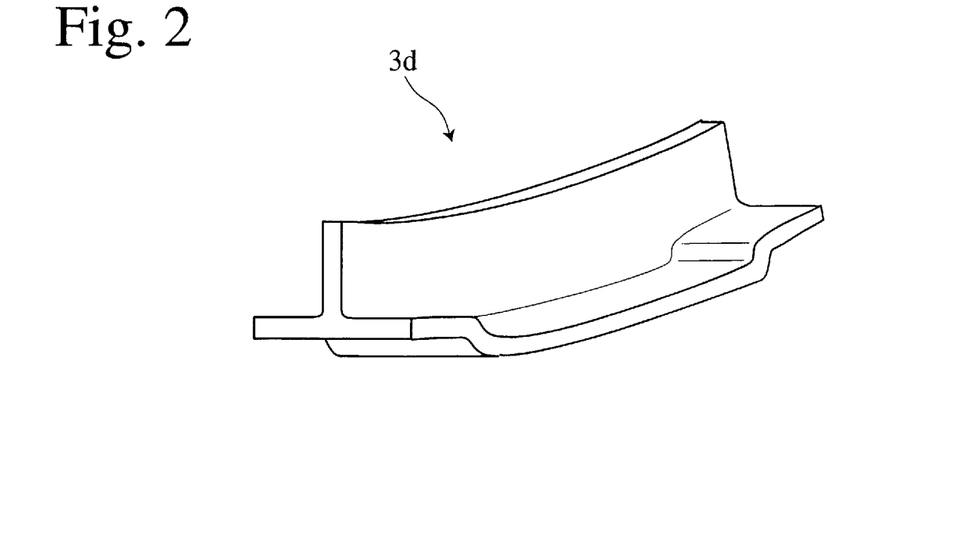
FIG. 2 is a perspective view showing an example of a stepped semi-hardened product produced by a method according to the present invention.

Explanations will be provided on producing a stepped semi-hardened product 3d shown in FIG. 2 by the method of the present invention by reference to FIGS. 3 to 9 below without intention of restricting the scope of the present invention.

(a) First Process

Figure 3:
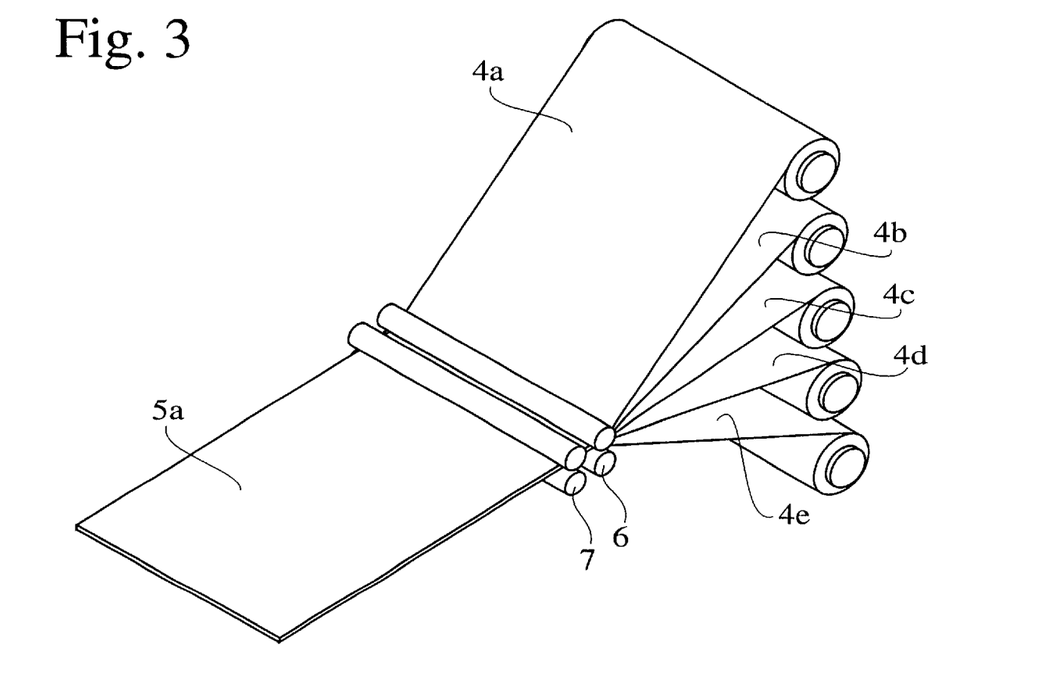
FIG. 3 is a perspective view showing production of a flat plate-shaped laminate used in the present invention.

FIG. 3 shows production of a first flat plate-shaped laminate 5a, where first sheets 4a to 4e each made of a fiber-reinforced composite are laminated to each other, heated under a pressure by a hot press roll 6, and cooled under a pressure by a cold press roll 7, automatically. In the present invention, the fiber-reinforced composite sheets are not piled on a complicated tool having a joggle, whereby the first process can be easily carried out automatically so that the first flat plate-shaped laminate of high quality can be stably provided with reduced processes.

Figure 4:
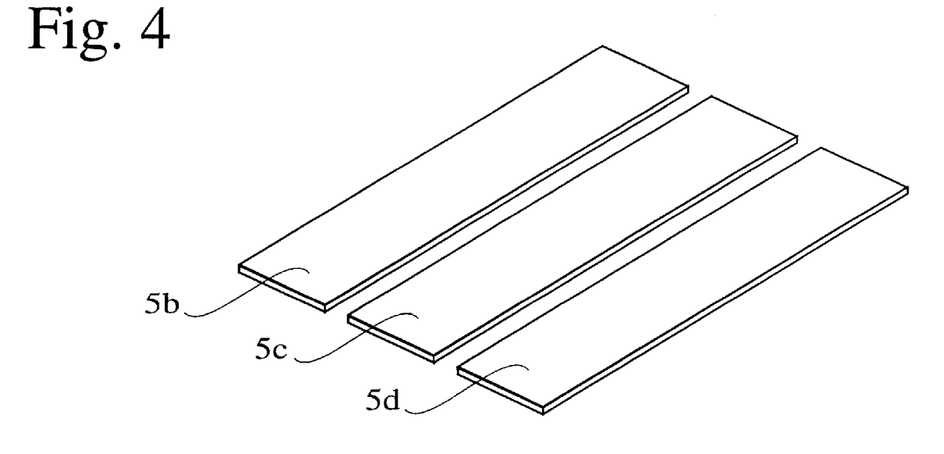
FIG. 4 is a perspective view showing flat plates obtained by cutting the flat plate-shaped laminate shown in FIG. 3.

Flat plates 5b, 5c and 5d shown in FIG. 4 is obtained by cutting the first flat plate-shaped laminate 5a in a predetermined size. In the conventional methods, the fiber-reinforced composites are cut many times and laminated on a forming tool. As compared with this, the first flat plate-shaped laminate 5a is prepared beforehand, and cut and formed in the present invention, so that the number of cutting processes is reduced to [1/lamination number of fiber-reinforced composites].

(b) Second Process

Figure 5:
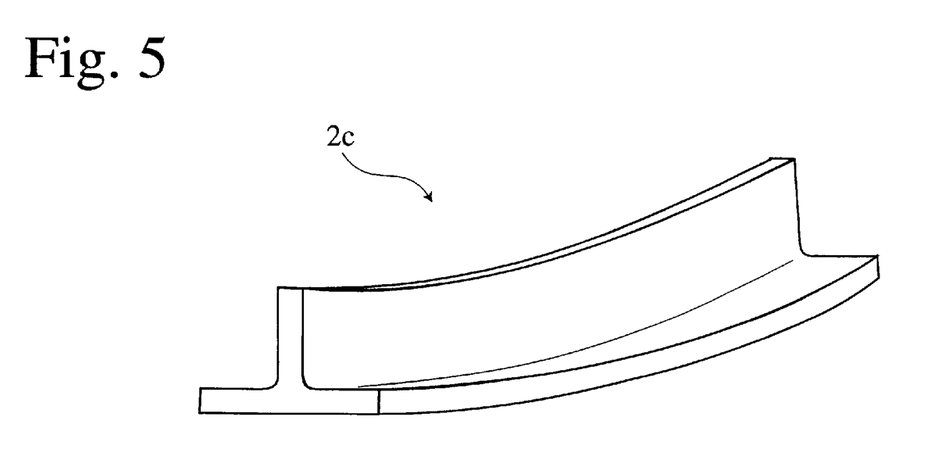
FIG. 5 is a perspective view showing a simple shaped intermediate used in the present invention.
Figure 6:
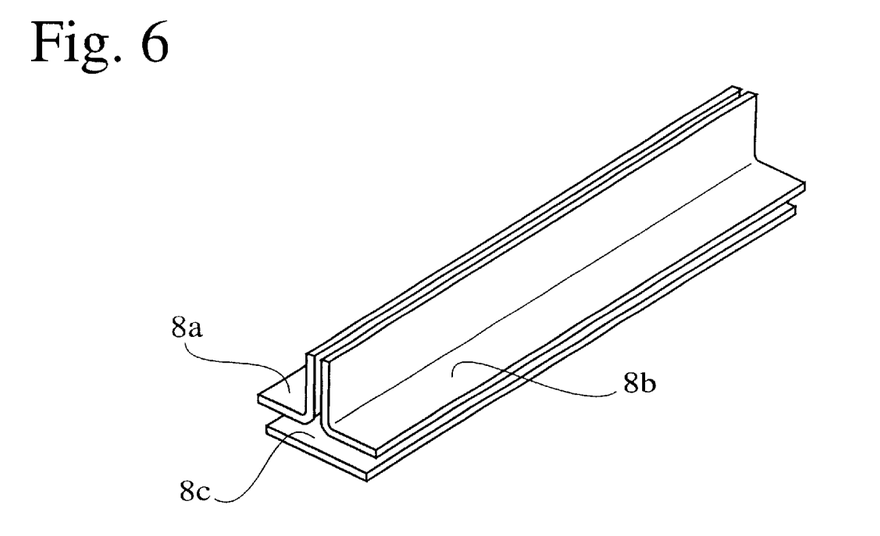
FIG. 6 is a perspective view showing a flat plate and L-shaped plates formed from the flat plates shown in FIG. 4.

A simple shaped intermediate 2c shown in FIG. 5 is prepared by two forming steps. Thus, the flat plates 5b, 5c and 5d are softened by heating and formed by cooling under a pressure, if necessary, to prepare L-shaped plates 8a and 8b and a flat plate 8c shown in FIG. 6, further, the plates 8a, 8b and 8c are softened by heating and formed by cooling under a pressure to prepare the simple shaped intermediate 2c. In the case where the simple shaped intermediate 2c has such a more simple shape as C-shape, it can be prepared by one forming step.

Figure 7:
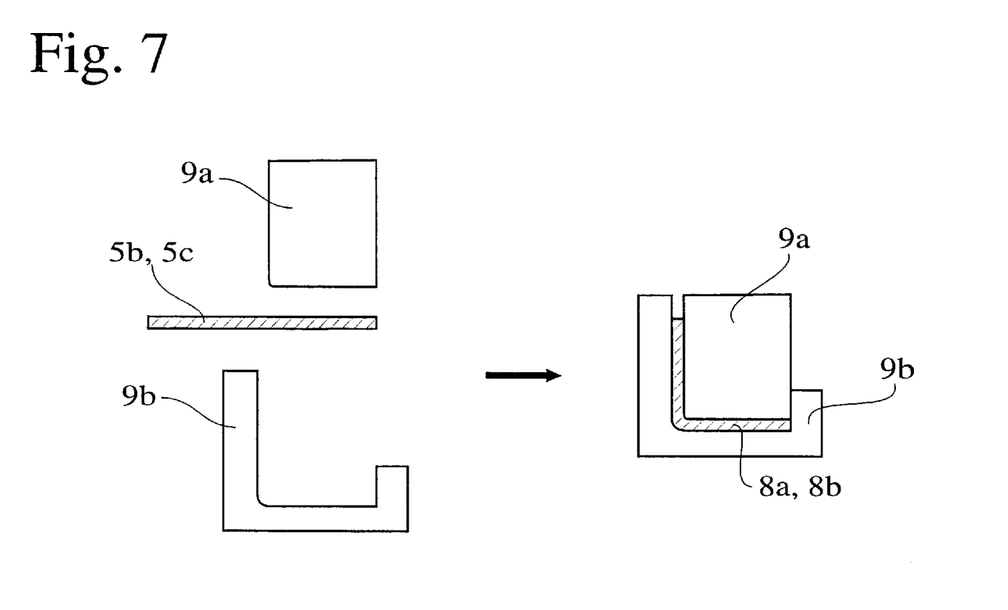
FIG. 7 is a side view showing formation of the L-shaped plates shown in FIG. 6.

The L-shaped plates 8a and 8b having the same shape can be formed from the flat plates 5b and 5c by simple tools 9a and 9b shown in FIG. 7. The flat plate 8c may be prepared only by cutting the first flat plate-shaped laminate 5a, thus, the flat plate 8c may be the same as the flat plate 5d. In this embodiment, because the plates 8a, 8b and 8c have the same lamination structure, needed is only one first flat plate-shaped laminate 5a to reduce the number of the laminating processes.

Figure 8:
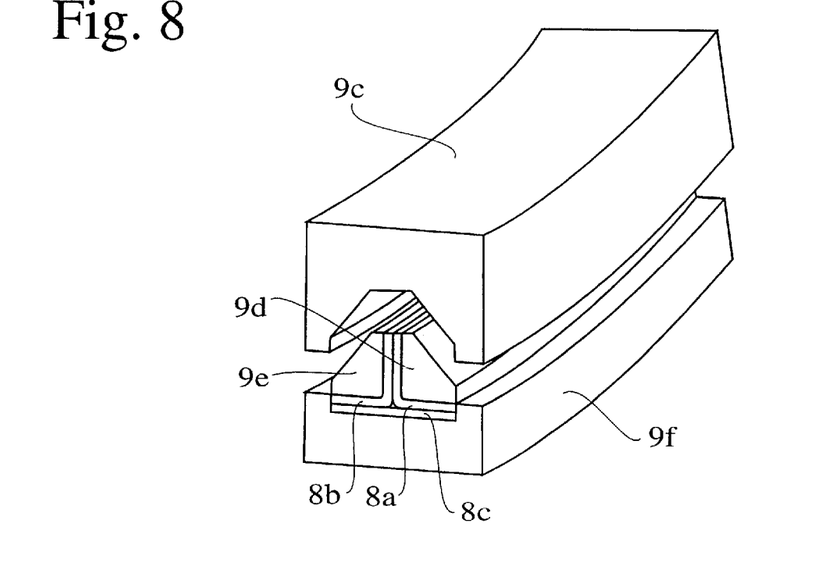
FIG. 8 is a perspective view showing formation of the simple shaped intermediate of FIG. 5 from the flat plate and the L-shaped plates shown in FIG. 6.
Figure 9:
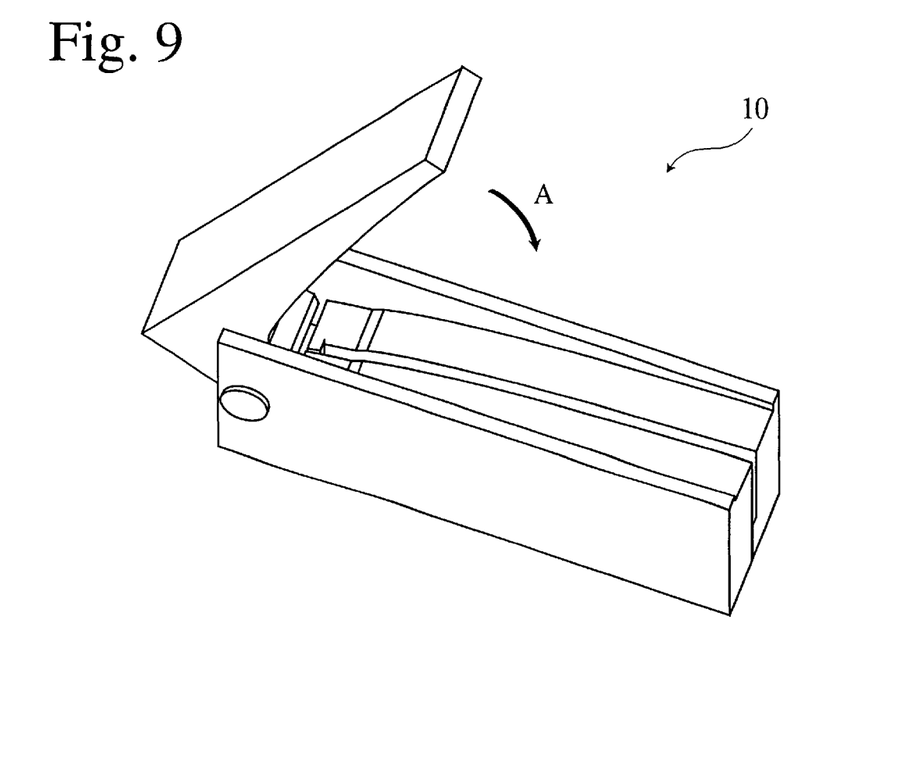
FIG. 9 is a perspective view showing a pressing machine for forming a joggle at an edge portion of the simple shaped intermediate of FIG. 5.

The simple shaped intermediate 2c may be prepared in a manner that the softened plates 8a, 8b and 8c are placed on a first forming tool 9f shown in FIG. 8, mounted first forming tools 9c to 9e on, and cooled under a pressure. The first forming tools 9c to 9f are usable for preparation of various intermediates having the same curvature as the simple shaped intermediate 2c, not correspondingly to the length thereof or shape of a joggle.

(c) Third Process

Edge portions of the simple shaped intermediate 2c are heated under a pressure to form joggles. In this embodiment, only the edge portions are heated by a dryer, and the simple shaped intermediate 2c is then placed on a pressing machine 10 shown in FIG. 9 and pressed as an arrow A shown in FIG. 9 to form the joggles, thereby producing the stepped semi-hardened product 3d shown in FIG. 2. The pressing machine 10 can be used for simple shaped intermediates having various lengths or shapes. Although there is a case that the resultant stepped semi-hardened product is wrinkled in this process, the wrinkles are disappeared when the stepped semi-hardened product is finally hardened with the skin member, etc. The stepped semi-hardened product obtained by the method according to the present invention may be stored at approximately room temperature.

[2] Method for Producing Preformed Structure

Figure 10:
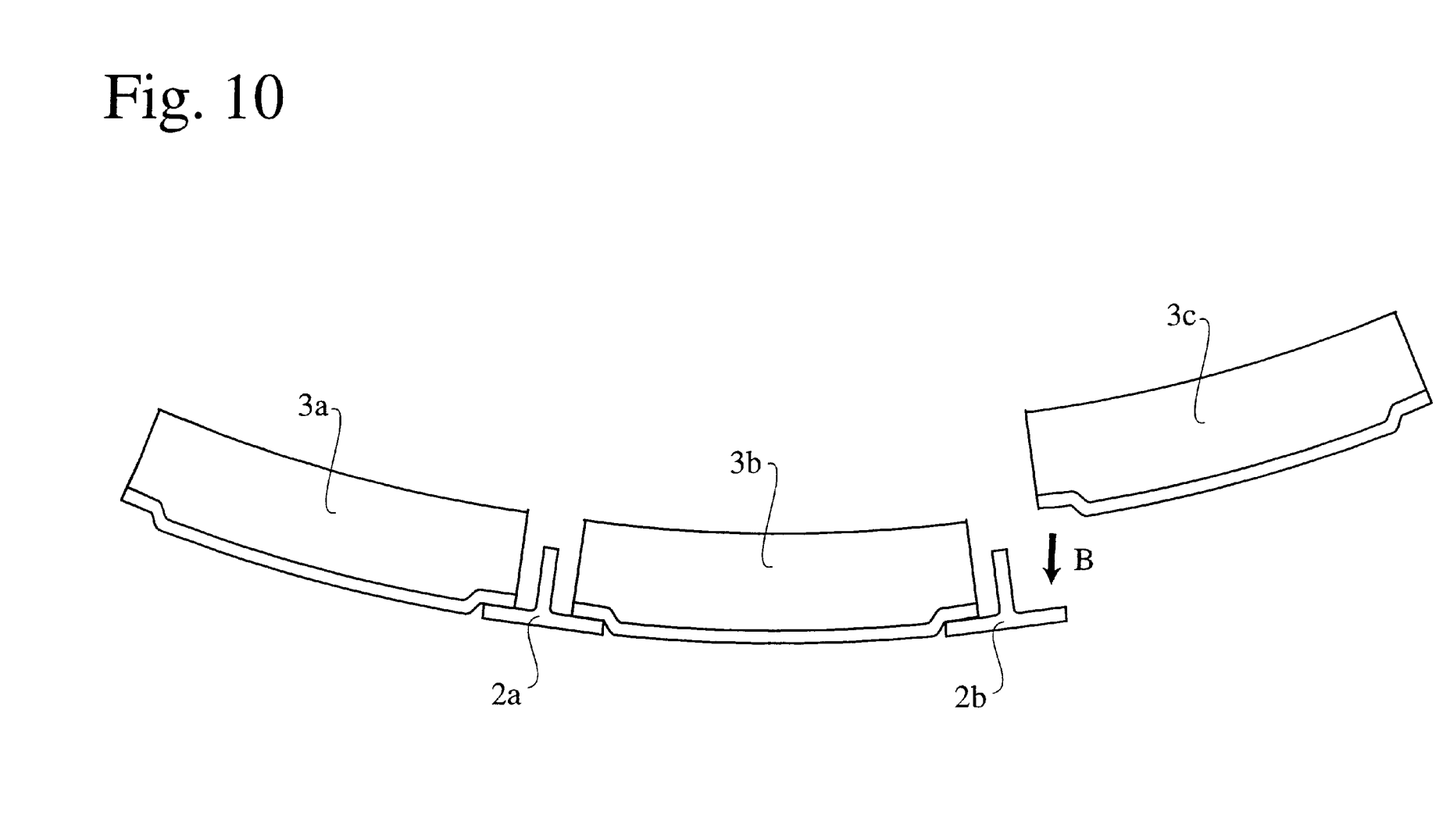
FIG. 10 is a front view showing production of a preformed structure by a method according to the present invention.

A method for producing a preformed structure of the present invention is such a method where the preformed structure is produced by piling a joggle of a stepped semi-hardened product made of a fiber-reinforced composite on a simple shaped semi-hardened product made of a fiber-reinforced composite. For example, as shown in FIG. 10, the preformed structure 1 shown in FIG. 1 is produced by: arranging simple shaped semi-hardened products 2a and 2b at a predetermined interval; piling joggles of stepped semi-hardened products 3a, 3b and 3c on the simple shaped semi-hardened products 2a and 2b as an arrow B.

The stepped semi-hardened product is produced by: the first process where a plurality of first sheets made of a fiber-reinforced composite are laminated to each other, heated under a pressure and cooled under a pressure to provide a first flat plate-shaped laminate; the second process where the first flat plate-shaped laminate is softened by heating, placed on a first forming tool and formed by cooling under a pressure to prepare a simple shaped intermediate; and the third process where an edge portion of the simple shaped intermediate is heated under a pressure to form the joggle. Thus, the stepped semi-hardened product used in the method for producing a preformed structure is produced by the above-mentioned method for producing a stepped semi-hardened product of the present invention.

Further, the simple shaped semi-hardened product is produced by: the fourth process where a plurality of second sheets made of a fiber-reinforced composite are laminated to each other, heated under a pressure and cooled under a pressure to provide a second flat plate-shaped laminate; and the fifth process where the second flat plate-shaped laminate is softened by heating, placed on a second forming tool and formed by cooling under a pressure. The preferred embodiments of the second sheets, the second flat plate-shaped laminate and the second forming tool are the same as those of the first sheets, the first flat plate-shaped laminate and the first forming tool; respectively. Further, the preferred embodiments such as a preferred fiber-reinforced composite, preferred heating conditions, preferred cooling conditions, etc. of the fourth process and the fifth process are the same as those of the first process and the second process, respectively. Thus, the simple shaped semi-hardened product may be substantially the same as the simple shaped intermediate used in the above-mentioned method for producing a stepped semi-hardened product of the present invention.

The method for producing a preformed structure of the present invention is suitable for producing such that is composed of the stepped semi-hardened product and the simple shaped semi-hardened product each having a T-shaped section. The stepped semi-hardened product and the simple shaped semi-hardened product may independently have a section of C-shape, I-shape, etc. Shape in the lengthening direction thereof is also not particularly limited. Numbers and positional relationships of the stepped semi-hardened products and the simple shaped semi-hardened products in the preformed structure is not particularly limited, and the preformed structure may be a lattice, etc. in shape. The simple shaped semi-hardened product and the stepped semi-hardened product is preferably made of the same fiber-reinforced composite, although they may be made of different fiber-reinforced composites. The simple shaped semi-hardened product preferably has the same lamination structure as the stepped semi-hardened product because only one flat plate-shaped laminate is needed in this case.

The preformed structure obtained by the method of the present invention may be heated under a pressure by a hot pressing machine, an autoclave, etc., integrated with the skin member, etc., and completely hardened to produce a final product. The preformed structure may be stored at approximately room temperature, although it may be completely hardened to produce the final product immediately after production thereof.

As described in detail above, according to a method of the present invention for producing a stepped semi-hardened product made of a fiber-reinforced composite, a stepped semi-hardened product of high quality can be stably produced with reduced processes and production costs. Further, a method for producing a preformed structure of the present invention utilizes the above method for producing a stepped semi-hardened product, so that a preformed structure can be produced with reduced processes and production costs. The method for producing a preformed structure of the present invention is useful for production of stiffener members composing a stiffened panel of an aircraft body structure, etc.

What is claimed is:

1. A method for producing a stepped semi-hardened product having a joggle in an edge portion, comprising: the first process where a plurality of first sheets made of a fiber-reinforced composite are laminated to each other, heated under a pressure and cooled under a pressure to provide a first flat plate-shaped laminate; the second process where said first flat plate-shaped laminate is softened by heating, placed on a first forming tool having a shape not corresponding to the joggle in the stepped semi-hardened product and formed by cooling under a pressure to prepare a simple shaped intermediate; and the third process where an edge portion of said simple shaped intermediate is heated under a pressure to form said joggle.

2. The method for producing a stepped semi-hardened product according to claim 1, wherein said simple shaped intermediate has a T-shaped section.

3. A method for producing a preformed structure composed of a stepped semi-hardened product having a joggle and a simple shaped semi-hardened product each made of a fiber-reinforced composite, wherein
    said stepped semi-hardened product is produced by: the first process where a plurality of first sheets made of a fiber-reinforced composite are laminated to each other, heated under a pressure and cooled under a pressure to provide a first flat plate-shaped laminate; the second process where said first flat plate-shaped laminate is softened by heating, placed on a first forming tool having a shape not corresponding to the joggle in the stepped semi-hardened product and formed by cooling under a pressure to prepare a simple shaped intermediate; and the third process where an edge portion of said simple shaped intermediate is heated under a pressure to form said joggle,
    said simple shaped semi-hardened product is produced by: the fourth process where a plurality of second sheets made of a fiber-reinforced composite are laminated to each other, heated under a pressure and cooled under a pressure to provide a second flat plate-shaped laminate; and the fifth process where said second flat plate-shaped laminate is softened by heating, placed on a second forming tool and formed by cooling under a pressure, and
    said joggle of said stepped semi-hardened product is piled on said simple shaped semi-hardened product.

4. The method for producing a preformed structure according to claim 3, wherein each of said simple shaped intermediate and said simple shaped semi-hardened product has a T-shaped section.

5. The method for producing a stepped semi-hardened product having a joggle in an edge portion according to claim 1, wherein said stepped semi-hardened product having a joggle is formed from said simple shaped intermediate, which simple shaped intermediate comprises a plurality of semi-hardened products having no joggle and having different lengths thereof, each formed in said commonly usable first forming tool from said first flat plate-shaped laminate.

6. The method for producing a stepped semi-hardened product having a joggle in an edge portion according to claim 1, wherein in said first process said plurality of first sheets made of said fiber-reinforced composite are heated at a temperature of 20 to 100° C. under 0.1 to 10 kg/cm$^2$, and cooled at a temperature of 10 to 30° C. under 0.1 to 10 kg/cm$^2$; and in said second process said first flat plate-shaped laminate is softened by heating at a temperature of 60 to 100° C. for 10 to 90 minutes placed on a forming tool, and formed by cooling at a temperature of 0 to 50° C. under a pressure of 0.1 to 10 kg/cm$^2$.

7. The method for producing a stepped semi-hardened product having a joggle in an edge portion according to claim 1, wherein in said third process said heating of said edge portion of said simple shaped intermediate is carried out by a dryer and said pressing is carried out by a pressing machine.

8. A method for producing a stepped semi-hardened product having a joggle in an edge portion, comprising: the first process where a plurality of first sheets made of a fiber-reinforced composite are laminated to each other, heated under a pressure and cooled under a pressure to provide a first flat plate-shaped laminate; the second process where said first flat plate-shaped laminate having a shape not corresponding to the joggle in the stepped semi-hardened product is softened by heating, placed on a first forming tool and formed by cooling under a pressure to prepare a simple shaped intermediate; and the third process where an edge portion of said simple shaped intermediate is heated under a pressure to form said joggle, wherein said stepped semi-hardened product has a hardening degree of 1 to 80%.

9. The method for producing a stepped semi-hardened product having a joggle in an edge portion according to claim 8, wherein said stepped semi-hardened product has a hardening degree of 1 to 50%.

* * * * *